US012767441B2

(12) United States Patent
Brecht

(10) Patent No.: US 12,767,441 B2
(45) Date of Patent: Oct. 20, 2026

(54) METHOD FOR OPERATING A STORAGE SYSTEM, AND STORAGE SYSTEM

(71) Applicant: SEW-EURODRIVE GMBH & CO. KG, Bruchsal (DE)

(72) Inventor: Roland Brecht, Karlsbad (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 362 days.

(21) Appl. No.: 18/290,039

(22) PCT Filed: Apr. 26, 2022

(86) PCT No.: PCT/EP2022/061059
§ 371 (c)(1),
(2) Date: Nov. 9, 2023

(87) PCT Pub. No.: WO2022/238112
PCT Pub. Date: Nov. 17, 2022

(65) Prior Publication Data

US 2024/0239602 A1 Jul. 18, 2024

(30) Foreign Application Priority Data

May 12, 2021 (DE) ..................... 10 2021 002 505.9

(51) Int. Cl.
*B65G 1/04* (2006.01)
*H02J 7/34* (2006.01)

(52) U.S. Cl.
CPC ......... *B65G 1/0492* (2013.01); *B65G 1/0407* (2013.01); *H02J 7/345* (2013.01)

(58) Field of Classification Search
CPC ....... B66F 9/07; B65G 1/0492; B65G 1/0435; B65G 1/0407
See application file for complete search history.

(56) References Cited

U.S. PATENT DOCUMENTS 6,253,901 B1 * 7/2001 Hintz ..................... B65G 47/50 198/370.06
7,184,855 B2 * 2/2007 Stingel, III .......... B65G 1/0464 414/789.6

(Continued)

FOREIGN PATENT DOCUMENTS

AT 502079 A1 1/2007
AT 516633 A1 7/2016

(Continued)

OTHER PUBLICATIONS

International Search Report issued in corresponding International Application No. PCT/EP2022/061059 dated Sep. 14, 2022, pp. 1-2, English Translation.

(Continued)

*Primary Examiner* — Kaitlin S Joerger
(74) *Attorney, Agent, or Firm* — Carter, DeLuca & Farrell LLP

(57) ABSTRACT

In a method for operating a storage system that includes a plurality of rack aisles, each of which includes a storage rack and a vehicle that is movable along the storage rack in a longitudinal direction, each vehicle including a lifting device, each lifting device including a receiving device for receiving a load, the receiving device being movable in a vertical direction, the electrical energy that is generated during operation by one of the vehicles in one of the rack aisles is supplied to another rack aisle. A storage system includes a plurality of rack aisles, each of which includes a storage rack and a vehicle that is movable along the storage rack in a longitudinal direction. Each of the vehicles includes a lifting device that includes a receiving device for receiving a load. The receiving device is movable in a vertical direction. The storage system is operable by the method.

21 Claims, 2 Drawing Sheets

(56) References Cited

U.S. PATENT DOCUMENTS

| | | | | |
|---|---|---|---|---|
| 7,646,156 | B2 | 1/2010 | Freudelsperger | |
| 8,612,110 | B2 * | 12/2013 | Ogawa | B60L 9/00 191/2 |
| 10,435,243 | B2 | 10/2019 | Schmidt | |
| 2001/0048277 | A1 * | 12/2001 | Naito | H02P 5/60 318/34 |
| 2009/0021023 | A1 * | 1/2009 | Freudelsperger | H02P 5/46 290/1 R |
| 2023/0024496 | A1 * | 1/2023 | Eil | G06Q 10/087 |

FOREIGN PATENT DOCUMENTS

| | | | | |
|---|---|---|---|---|
| CN | 113824202 | A * | 12/2021 | B66F 9/0759 |
| DE | 102009024357 | A1 | 12/2010 | |
| DE | 102014220165 | A1 | 4/2016 | |
| DE | 102016003665 | A1 | 10/2016 | |
| DE | 102010020124 | B4 | 7/2020 | |
| EP | 3543200 | A1 | 9/2019 | |
| WO | 2008031608 | A1 | 3/2008 | |
| WO | 2016/094923 | A2 | 6/2016 | |

OTHER PUBLICATIONS

International Report on Patentability issued in corresponding International Application No. PCT/EP2022/061059 dated Nov. 14, 2023, pp. 1-5, English Translation.

* cited by examiner

METHOD FOR OPERATING A STORAGE SYSTEM, AND STORAGE SYSTEM

FIELD OF THE INVENTION

The present invention relates to a method for operating a storage system, including, for example, a plurality of rack aisles, each of which includes a storage rack and a vehicle that is movable along the storage rack in a longitudinal direction. Each of the vehicles have a lifting device, including a receiving being movable in a vertical direction. The present invention also relates to a storage system that is operable using the method described herein.

BACKGROUND INFORMATION

Certain conventional storage systems are used in technical plants, for example, in production plants, to store raw materials and manufactured products until they are used again, for example, for processing or shipping. For easy transport of the raw materials and products, these are placed, for example, in or on load carriers. The load carriers are, for example, crates, boxes, or pallets.

A conventional storage system includes a plurality of storage racks, each of which has a plurality of levels that are arranged offset from each other in a vertical direction, i.e., one above the other. Each level has a plurality of storage compartments for receiving load carriers, and the storage compartments of a level are arranged side by side. This arrangement with a plurality of levels arranged one above the other allows a plurality of load carriers to be received on a relatively small footprint.

Storage and retrieval devices are, for example, used for storing goods from the storage compartments and retrieving goods from the storage compartments. A storage and retrieval device is a vehicle that is movable along a storage rack in a longitudinal direction in a rack aisle. A storage and retrieval device has a lifting device, including a receiving device for receiving the load, the receiving device being movable in a vertical direction.

Electrical energy is required to accelerate the vehicle in the longitudinal direction, and electrical energy is generated when the vehicle brakes in the longitudinal direction. Electrical energy is required to lift a load in the vertical direction, and electrical energy is generated when the load is lowered in the vertical direction.

An electrically operable storage and retrieval device is described in German Patent Document No. 10 2010 020 124. The storage and retrieval device is movable on a floor and is used to lift and move masses in the vertical direction.

A storage system and a method for operating a storage system are described in German Patent Document No. 10 2016 003 665. The storage system has a plurality of aisles in which a vehicle is movable.

A storage arrangement with a plurality of storage locations for piece goods is described in Austrian Patent Documet No. 516633. A plurality of automated storage and retrieval devices are provided for storing and retrieving piece goods.

A rack storage system with a plurality of rack units is described in Austrian Patent Document No. 502079. Each rack unit has its own movable storage and retrieval device with electric drive motors.

An industrial plant with a rack storage is described in German Patent Document No. 10 2009 024 357. Goods are storable in and retrievable from the rack storage. The rack storage has a plurality of electrically operated storage and retrieval devices.

A goods storage is described in PCT Patent Document No. WO 2008/031608, in which a storage and retrieval device provides for the transport of goods. The storage and retrieval device runs on rails and has a chassis with a drive motor.

SUMMARY

Example embodiments of the present invention provide a method for operating a storage system, and a storage system.

According to example embodiments of the present invention, in a method for operating a storage system, in which the storage system includes a plurality of rack aisles, each of which includes a storage rack and a vehicle movable along the storage rack in a longitudinal direction, each vehicle including. a lifting device, each including a receiving device for receiving a load, the receiving device being arranged, for example, in the form of a platform and is movable in a vertical direction, electrical energy generated during operation by one of the vehicles in one of the rack aisles is supplied to another rack aisle.

The method described herein allows kinematic and potential energy that is released in the short term during operation of a vehicle to be converted into electrical energy and stored. The energy stored in this manner is retrievable later. Thus, the energy demand of the storage system is, for example, reduced. Furthermore, a peak power demand of the storage system is minimized, and, thus, the required connected load is, for example, reduced. For example, in a storage system, all vehicles are not, or only very rarely, in operation at the same time. For example, the method described herein makes it possible to supply the electrical energy generated to a rack aisle whose vehicle is not currently in operation. The electrical energy supplied to another rack aisle is storable in the other rack aisle, for example, in an electrical energy storage, or convertible into potential energy.

According to example embodiments, each of the rack aisles has an intermediate circuit capacitor. Electrical energy generated during operation by one of the vehicles in one of the rack aisles is stored in the intermediate circuit capacitor of another rack aisle. By dividing the electrical energy among a plurality of intermediate circuit capacitors, the required capacitance of the intermediate circuit capacitors in the individual rack aisles is reduced.

For example, the intermediate circuit capacitors of the rack aisles are electrically connected to each other. The intermediate circuit capacitors of the rack aisles thus form a parallel circuit.

According to example embodiments, each of the rack aisles has a rechargeable battery. Electrical energy generated during operation by one of the vehicles in one of the rack aisles is stored in the battery of another rack aisle. By dividing the electrical energy among a plurality of batteries, the required capacitance of the batteries in the individual rack aisles is reduced.

For example, the batteries of the rack aisles are electrically connected to each other. The batteries of the rack aisles thus form a parallel circuit.

According to example embodiments, electrical energy generated during operation by one of the vehicles in one of the rack aisles is used to drive a vehicle in another rack aisle in the longitudinal direction. Intermediate storage of the energy is thus not required. The electrical energy generated in the one rack aisle is converted into kinetic energy in the other rack aisle.

According to example embodiments, electrical energy generated during operation by one of the vehicles in one of the rack aisles is used to drive the receiving device of the lifting device of a vehicle in another rack aisle in the vertical direction. Intermediate storage of the energy is thus not required. The electrical energy generated in the one rack aisle is converted into potential energy in the other rack aisle.

According to example embodiments, electrical energy generated during operation by one of the vehicles in one of the rack aisles is used to move a load from a lower storage compartment to an upper storage compartment in another rack aisle. For example, the upper storage compartment is further away from a floor in the vertical direction than the lower storage compartment. The electrical energy generated in the one rack aisle is converted into potential energy in the other rack aisle by moving the load upwardly.

According to example embodiments, electrical energy required to operate one of the vehicles in one of the rack aisles is generated in another rack aisle by moving a load from an upper storage compartment to a lower storage compartment in the other rack aisle. For example, the upper storage compartment is further away from a floor in the vertical direction than the lower storage compartment. The electrical energy required in the one rack aisle is generated in the other rack aisle by converting potential energy by moving the load downwardly.

According to example embodiments of the present invention, a storage system includes a plurality of rack aisles, each of which includes a storage rack and a vehicle movable along the storage rack in a longitudinal direction. Each of the vehicles includes a lifting device, each including a receiving device for receiving a load. The receiving device is arranged, for example, in the form of a platform and is movable in a vertical direction. The storage system is operable with the method described herein.

In the storage system, kinematic energy as well as potential energy, which is released in the short term during operation of a vehicle, is convertible into electrical energy and storable. The energy stored in this manner is retrievable later. Thus, the energy demand of the storage system is, for example, reduced. Furthermore, a peak power demand of the storage system is minimized, and, thus, the required connected load is, for example, reduced. The electrical energy supplied to another rack aisle is storable in the other rack aisle, for example, in an electrical energy storage, or convertible into potential energy.

According to example embodiments, the storage system includes an order system for transmitting logistics orders to a control unit and a control unit for coordinating received logistics orders and for transmitting individual orders to the individual rack aisles.

Further features and aspects of example embodiments of the present invention are explained in more detail below with reference to the appended schematic Figures.

DETAILED DESCRIPTION

Figure 1:
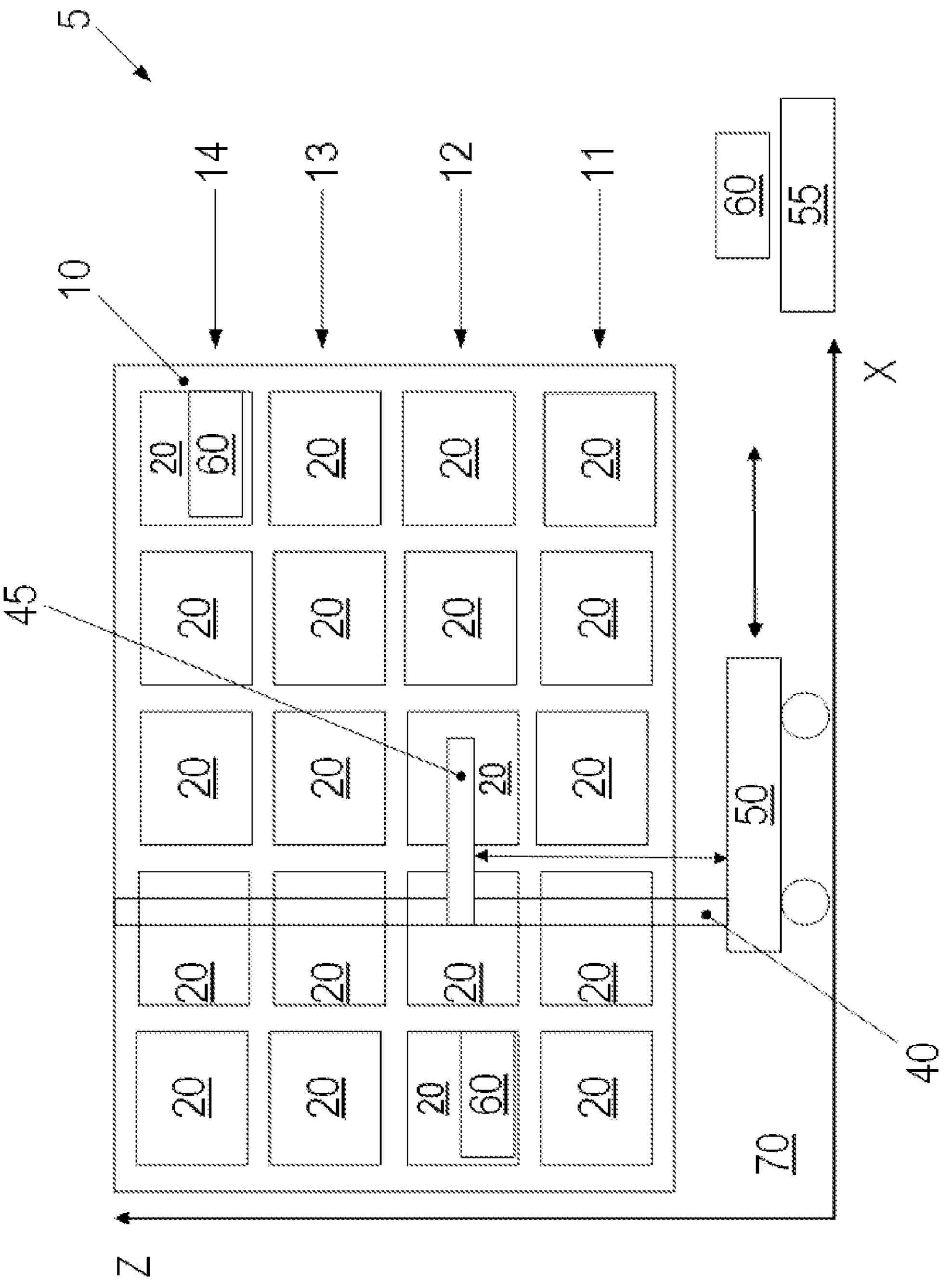
FIG. 1 schematically illustrates a rack aisle.

FIG. 1 schematically illustrate a rack aisle 5. The rack aisle 5 includes a storage rack 10 and a vehicle 50. The storage rack 10 stands on a floor 70. The rack aisle 5 is part of a storage system 2. The storage system 2 includes a plurality of rack aisles 5, which are arranged at least approximately identical to the illustrated rack aisle 5.

The vehicle 50 is arranged as a storage and retrieval device. The vehicle 50 is movable along the storage rack 10 in a longitudinal direction X in the rack aisle 5. The vehicle 50 has a lifting device 40, which includes a receiving device 45 for receiving a load 60. The receiving device is arranged in the form of a platform and is movable in a vertical direction Z. The load 60 is, for example, crates, boxes, or pallets filled with products.

The vertical direction Z extends perpendicular to the floor 70 on which the storage rack 10 stands. The longitudinal direction X extends at a right angle to the vertical direction Z and parallel to the floor 70. A cross direction extends at a right angle to the vertical direction Z and at a right angle to the longitudinal direction X.

The storage rack 10 includes a plurality of levels 11, 12, 13, 14, for example, a first level 11, a second level 12, a third level 13, and a fourth level 14. The levels 11, 12, 13, 14 are arranged offset from each other in the vertical direction Z, i.e., one above the other. The first level 11 is arranged at the bottom, i.e., facing the floor 70. The fourth level 14 is arranged at the top, i.e., facing away from the floor 70.

Each of the levels 11, 12, 13, 14 has a plurality of storage compartments 20 for receiving loads 60. The storage compartments 20 of a level 11, 12, 13, 14 are arranged side by side in the longitudinal direction X. By a movement of the vehicle 50 in the longitudinal direction X combined with a movement of the receiving device 45 in the vertical direction Z, each of the storage compartments 20 can be accessed for storing as well as retrieving loads 60.

The rack aisle 5 also includes a transfer station 55. The transfer station 55 is located below the levels 11, 12, 13, 14 of the storage rack 10. Thus, the transfer station 55 is further away from the floor in the vertical direction Z than the storage compartments 20 on levels 11, 12, 13, 14 of the storage rack 10.

For storing, a load 60 is provided on the transfer station 55 and moved from there to the receiving device 45 of the vehicle 50. The load 60 on the receiving device 45 is moved to a storage compartment 20 and placed in the storage compartment 20.

For retrieving, a load 60 is moved out of a storage compartment 20 onto the receiving device 45 of the vehicle 50. The load 60 on the receiving device 45 is moved to the transfer station 55 and made available on the transfer station 55.

The vehicle 50 has an electric drive for movement in the longitudinal direction X. Electrical energy is required for accelerating the vehicle 50 in the longitudinal direction X. When the vehicle 50 is decelerated in the longitudinal direction X, electrical energy is generated in a generative manner.

The lifting device 40 of the vehicle 50 has an electric drive for moving the receiving device 45 in the vertical direction Z. Electrical energy is required for lifting the receiving device 45 in the vertical direction Z. When the receiving device 45 is lowered in the vertical direction Z, electrical energy is generated in a generative manner.

The rack aisle 5 has a power feed for supplying electrical power to the vehicle 50, e.g., also to the lifting device 40. The rack aisle 5 also has an intermediate circuit capacitor for storing electrical energy. Optionally, the rack aisle 5 further has a rechargeable battery for storing electrical energy.

Figure 2:
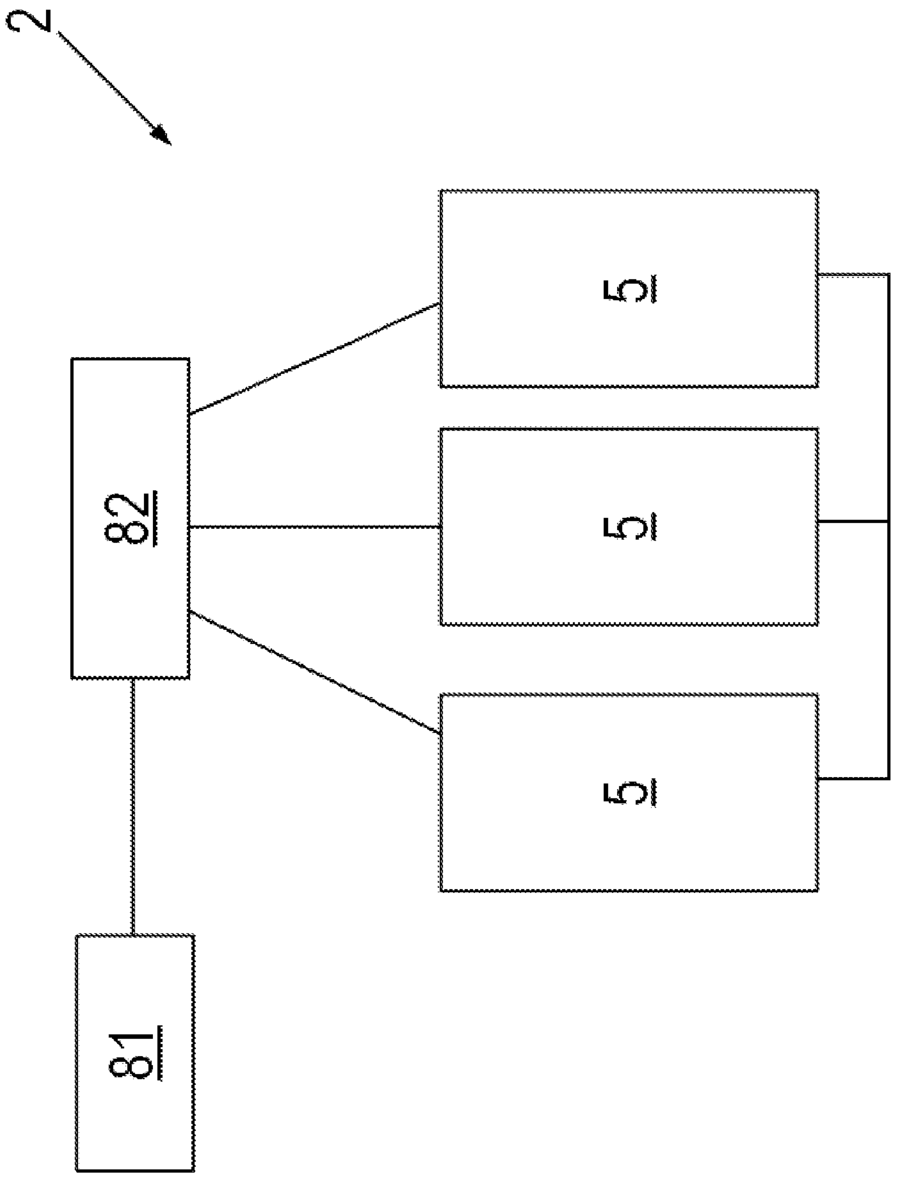
FIG. 2 schematically illustrates a storage system.

FIG. 2 schematically illustrate a storage system 2. For example, the storage system 2 includes three rack aisles 5, which are arranged as illustrated in FIG. 1. Each of the rack aisles 5 thus includes a power feed for supplying electrical energy, an intermediate circuit capacitor for storing electrical energy, optionally a rechargeable battery for storing electrical energy, and a storage rack 10 and a vehicle 50.

The intermediate circuit capacitors of the individual rack aisles 5 are electrically connected to each other. The intermediate circuit capacitors of the rack aisles 5 thus form a parallel circuit. The optional batteries of the individual rack aisles 5 are also electrically connected to each other. The batteries of the rack aisles 5 thus also form a parallel circuit.

The storage system 2 includes an order system 81 and a control unit 82. The order system 81 transmits logistics orders to the control unit 82, e.g., orders for storing loads 60 as well as orders for retrieving loads 60. The control unit 82 coordinates the received logistics orders and transmits individual orders to the individual rack aisles 5.

For example, the control unit 82 coordinates the received logistics orders such that electrical energy generated during operation by one of the vehicles 50 in one of the rack aisles 5 is supplied to another rack aisle 5. The control unit 82 also coordinates the received logistics orders such that electrical energy required during operation by one of the vehicles 50 in one of the rack aisles 5 is generated in another rack aisle 5. The individual orders are thus kinematically matched such that generated electrical energy remains largely within the storage system 2.

For example, the order system 81 transmits to the control unit 82 a logistics order for retrieving a load 60. The control unit 82 transmits to one of the rack aisles 5 an individual order to move the load 60 from a storage compartment 20 to the transfer station 55. During execution of this individual order, electrical energy is generated. Further, the control unit 82 transmits to another of the rack aisles 5 an additional individual order to move a load 60 from a lower storage compartment 20 to an upper storage compartment 20. During execution of this individual order, electrical energy is used.

For example, the order system 81 transmits to the control unit 82 a logistics order for storing a load 60. The control unit 82 transmits an individual order to one of the rack aisles 5 to move the load 60 from the transfer station 55 to a storage compartment 20. During execution of this individual order, electrical energy is required. Further, the control unit 82 transmits to another of the rack aisles 5 an additional individual order to move a load 60 from an upper storage compartment 20 to a lower storage compartment 20. During execution of this individual order, electrical energy is generated.

The invention claimed is:

1. A method for operating a storage system that includes a plurality of rack aisles, each rack aisle including a storage rack and a vehicle that is movable along the storage rack in a longitudinal direction, each vehicle including a lifting device having a receiving device adapted to receive a load and being in a vertical direction, comprising:

supplying electrical energy that is generated during operation by the vehicle of a first one of the rack aisles to a second one of the rack aisles;

wherein each rack aisle includes a respective an intermediate circuit capacitor, the method further comprising storing, in the intermediate circuit capacitor of the second rack aisle, the electrical energy generated during operation by the vehicle of the first one of the rack aisles.

2. The method according to claim 1, wherein the intermediate circuit capacitors of the rack aisles are electrically connected to each other.

3. The method according to claim 2, wherein the intermediate circuit capacitors of the rack aisles are electrically connected to each other in a parallel circuit.

4. A method for operating a storage system that includes a plurality of rack aisles, each rack aisle including a storage rack and a vehicle that is movable along the storage rack in a longitudinal direction, each vehicle including a lifting device having a receiving device adapted to receive a load and being in a vertical direction, comprising:

supplying electrical energy that is generated during operation by the vehicle of a first one of the rack aisles to a second one of the rack aisles;

wherein each rack aisle includes a respective rechargeable battery, the method further comprising storing, in the rechargeable battery of the second rack aisle, the electrical energy generated during operation by the vehicle of the first one of the rack aisles.

5. The method according to claim 4, wherein the rechargeable batteries of the rack aisles are electrically connected to each other.

6. The method according to claim 5, wherein the rechargeable batteries of the rack aisles are electrically connected to each other in a parallel circuit.

7. The method according to claim 1, wherein the electrical energy generated during operation by the vehicle of the first one of the rack aisles is used to drive the vehicle of the second one of the rack aisles in the longitudinal direction.

8. The method according to claim 1, wherein the electrical energy generated during operation by the vehicle of the first one of the rack aisles is used to drive the receiving device of the lifting device of the vehicle of the second one of the rack aisles in the vertical direction.

9. The method according to claim 7, wherein the electrical energy generated during operation by the vehicle of the first one of the rack aisles is used to drive the receiving device of the lifting device of the vehicle of the second one of the rack aisles in the vertical direction.

10. The method according to claim 1, wherein the electrical energy generated during operation by the vehicle of the first one of the rack aisles is used in the second one of the rack aisles to move a load from a lower storage compartment to an upper storage compartment, the upper storage compartment being farther away from a floor in the vertical direction than the lower storage compartment.

11. The method according to claim 1, wherein electrical energy required for operation of the vehicle of the second one of the rack aisles is generated in the first one of the rack aisles by moving a load from an upper storage compartment to a lower storage compartment in the first one of the rack aisles, the upper storage compartment being farther away from a floor in the vertical direction than the lower storage compartment.

12. A storage system, comprising:

a plurality of rack aisles, each rack aisle including a storage rack, a respective an intermediate circuit capacitor, and a vehicle, the vehicle adapted to move along the storage rack in a longitudinal direction, each vehicle including a lifting device that includes a receiving device adapted to receive a load, the receiving device adapted to move in a vertical direction;

wherein the storage system is adapted to operate according to the method recited in claim 1.

13. The storage system according to claim 12, further comprising an order system and a control unit, the order system being adapted to transmit logistics orders to the control unit, the control unit being adapted to coordinate received logistics orders and to transmit individual orders to respective individual rack aisles.

14. The storage system according to claim 12, wherein each intermediate circuit capacitor is adapted to store the electrical energy supplied to the respective rack aisle.

15. The storage system according to claim 14, wherein the intermediate circuit capacitors of the rack aisles are electrically connected to each other.

16. The storage system according to claim 15, wherein the intermediate circuit capacitors of the rack aisles are electrically connected to each other in a parallel circuit.

17. A storage system, comprising:

a plurality of rack aisles, each rack aisle including a storage rack, a respective rechargeable battery adapted to store electrical energy supplied to the rack aisle, and a vehicle, the vehicle adapted to move along the storage rack in a longitudinal direction, each vehicle including a lifting device that includes a receiving device adapted to receive a load, the receiving device adapted to move in a vertical direction;

wherein the storage system is adapted to operate according to the method recited in claim 16.

18. The storage system according to claim 17, wherein the rechargeable batteries of the rack aisles are electrically connected to each other.

19. The storage system according to claim 18, wherein the rechargeable batteries of the rack aisles are electrically connected to each other in a parallel circuit.

20. A storage system, comprising:

a plurality of rack aisles, each rack aisle including a storage rack and a vehicle, the vehicle adapted to move along the storage rack in a longitudinal direction, each vehicle including a lifting device that includes a receiving device adapted to receive a load, the receiving device adapted to move in a vertical direction;

wherein at least one first one of the rack aisles is adapted to supply electrical energy that is generated during operation by the vehicle of the first one of the rack aisles to at least one second one of the rack aisles; and wherein each rack aisle includes a respective an intermediate circuit capacitor adapted to store the electrical energy supplied to the rack aisle.

21. A storage system, comprising:

a plurality of rack aisles, each rack aisle including a storage rack and a vehicle, the vehicle adapted to move along the storage rack in a longitudinal direction, each vehicle including a lifting device that includes a receiving device adapted to receive a load, the receiving device adapted to move in a vertical direction;

wherein at least one first one of the rack aisles is adapted to supply electrical energy that is generated during operation by the vehicle of the first one of the rack aisles to at least one second one of the rack aisles; and wherein each rack aisle includes a respective rechargeable battery adapted to store the electrical energy supplied to the rack aisle.

* * * * *